Figure 1:
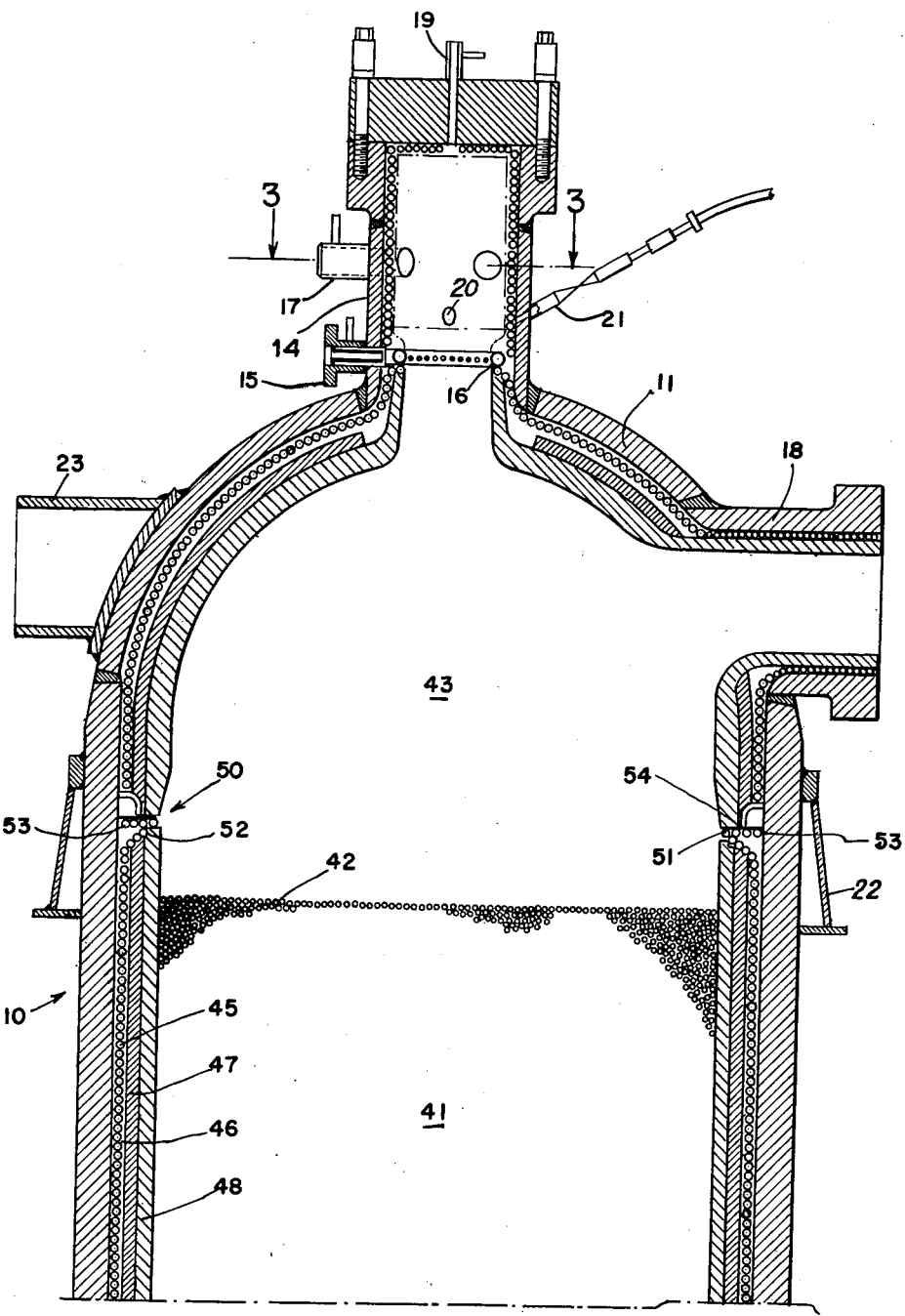

Feb. 4, 1964

E. DURHAM ETAL 3,120,380

REGENERATIVE HEATER

Filed Aug. 6, 1959

3 Sheets-Sheet 1

INVENTORS
EDWIN DURHAM
ANDREW B. STEEVER

BY

*[signature]*

ATTORNEY

Feb. 4, 1964  E. DURHAM ETAL  3,120,380
REGENERATIVE HEATER
Filed Aug. 6, 1959  3 Sheets-Sheet 2
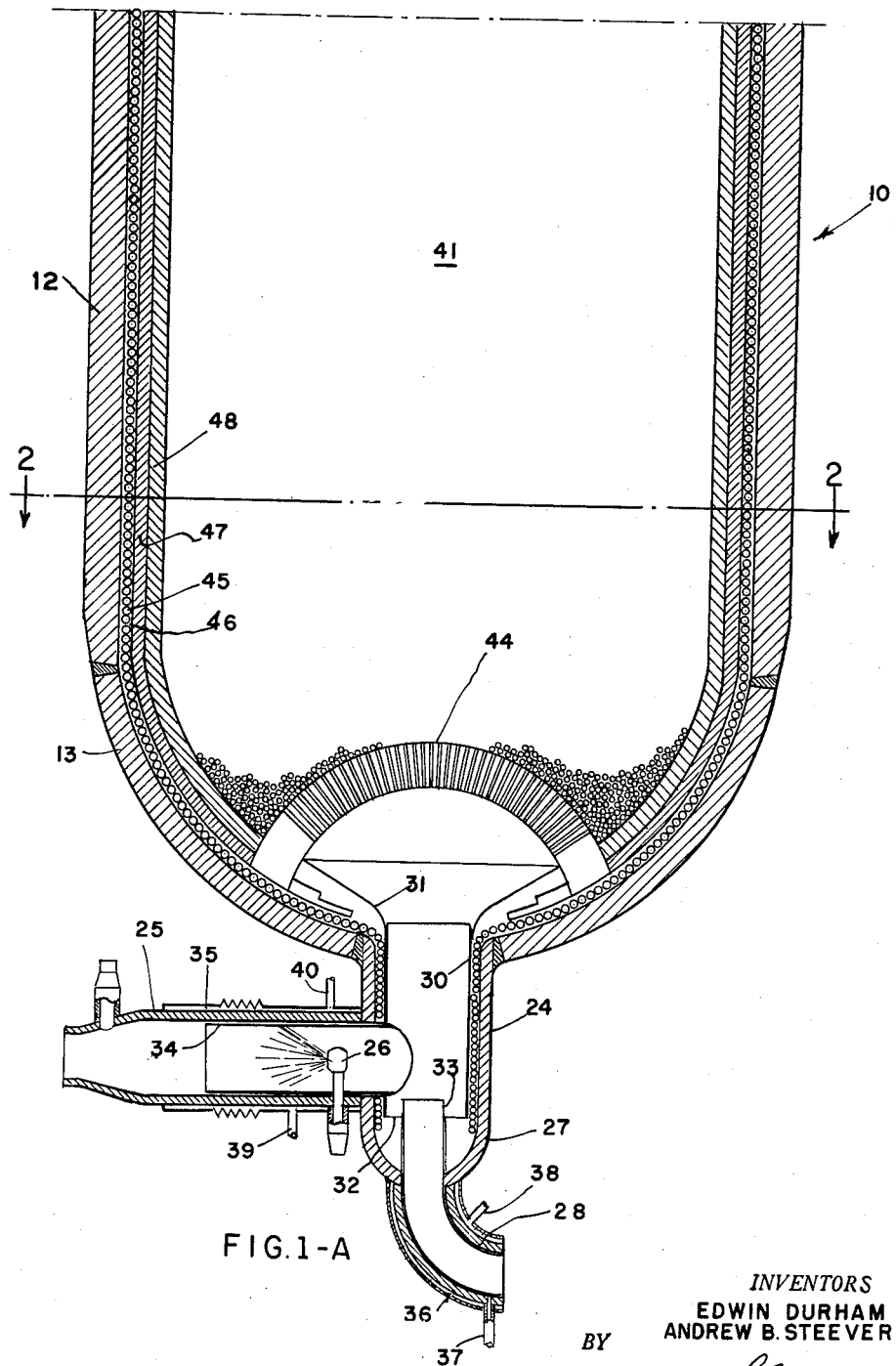
FIG.1-A
INVENTORS
EDWIN DURHAM
ANDREW B. STEEVER
BY
ATTORNEY

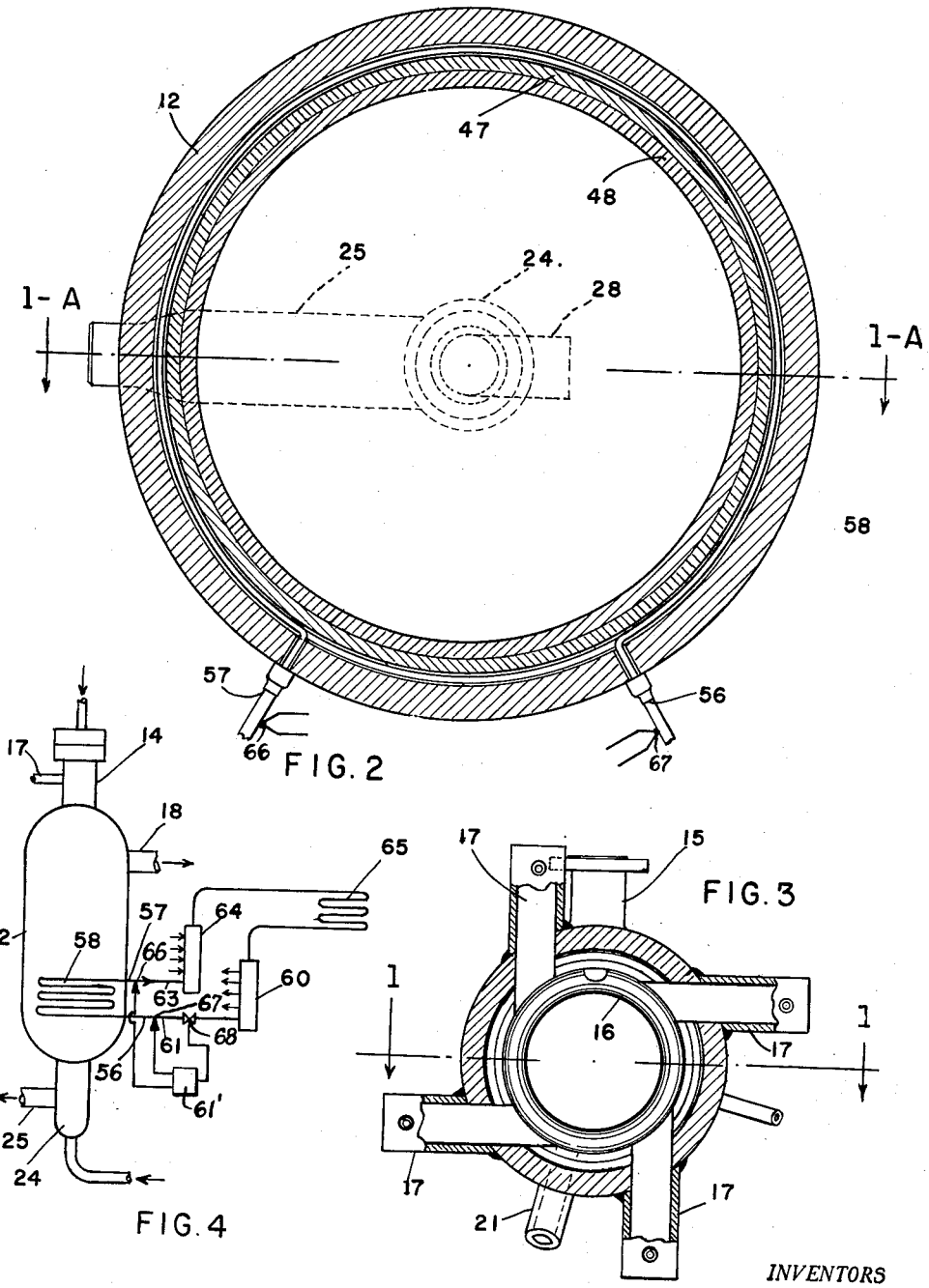

3,120,380
REGENERATIVE HEATER
Edwin Durham, Wadsworth, Ohio, and Andrew B. Steever, Old Greenwich, Conn., assignors to The Babcock & Wilcox Company, New York, N.Y., a corporation of New Jersey
Filed Aug. 6, 1959, Ser. No. 831,994
6 Claims. (Cl. 263—19)

The present invention relates to a high temperature, high pressure fixed bed regenerative heater, and more particularly to the construction and arrangement of heater vessel containing a regenerative pebble bed, where the bed is heated to high temperatures by fuel combustion and the heat of the bed thereafter transferred to high pressure air for use in wind tunnel experiments.

In studying the behavior of air-borne objects travelling at velocities above the speed of sound, it is convenient to simulate this condition by passing high temperature, high pressure air through a nozzle to convert the energy in the air to velocity, for obtaining the air velocities desired. By preheating 2000 p.s.i. air to temperatures of the order of 3000 to 4000 F., and passing it through properly designed nozzles, it is possible to attain air velocities in the range of from 5 to 10 times the speed of sound. However, the heating of the 2000 p.s.i. air to the temperatures indicated imposes severe operating conditions on the air heating equipment, particularly when the complete cycle, consisting of the heating of the pebble bed by combustion gases, the regenerative heating of the air to the required temperature and discharging of the preheated air through nozzles to the wind tunnel will be completed in one half to one hour.

According to the present invention, the regenerative pebble bed is confined in a pressure vessel which is provided with fluid confining tubes located closely adjacent the inner surface of the vessel where the tubes are submerged in a layer of insulating material. The tubes are positioned adjacent the pressure vessel walls, and are thus able to accommodate differential expansion relative to the pressure vessel walls. Advantageously, the tubes are arranged in a number of separate parallel circuits, each of which consists of a spiral flow path connected into common inlet and outlet headers. The fluid flow through each circuit may be separately controlled. The tube metal temperatures may be adapted to monitor the circuit flows, thereby providing the means for insuring proper flow distribution amongst the circuits, while at the same time affording indication of impending refractory failure. The interior of the vessel is lined with successive layers of insulating material and abrasion and temperature resistant refractory.

The pressure vessel is loaded with heat exchange pebbles or pellets with the bed so formed having its upper level spaced below a combustion zone which is supplied with fuel and air to produce hot gaseous combustion gas. The hot gases are passed through the pebble bed, giving up heat to the pebbles, with the cooled gases discharged from the pressure vessel at the end opposite the fuel combustion zone.

When the pebble bed has been heated to a desired value, the fuel and air supply is discontinued and the high pressure air to be heated is passed through the pebble bed in a direction opposite to the direction of heating gas flow. The heated high pressure air is discharged from the vessel at a position adjacent the combustion space and above the upper level of the pebble bed.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

FIGS. 1 and 1A are longitudinal sections of the upper and lower end portions, respectively, of a fluid heater constructed in accordance with the present invention;

FIGS. 2 and 3 are transverse sections taken on the lines 2—2 and 3—3, respectively, of FIGS. 1A and 1; and FIG. 4 is a diagrammatic showing of a typical fluid flow circuit for the pressure vessel of the heater shown in FIGS. 1 and 1A.

In the embodiment of the invention shown in the drawings, the pressure vessel is intended to heat 2000 p.s.i. air to a temperature of the order of 3000 F. at a rate sufficient to permit operating cycles of 30 minutes, i.e. the pebble bed is heated by fuel combustion, the high pressure air, heated to the desired temperature, is discharged to the wind tunnel, the flow of high pressure air discontinued, the vessel purged and the cycle repeated in 30 minutes. The same pressure vessel may be operated at a temperature of 4000 F. with proper refractory for the pebble bed and the linings, with a different burner.

As shown particularly in FIGS. 1 and 1A, the upper end portion of the pressure vessel 10 is formed of a hemispherical end closure 11 which is welded to the upper end of a cylindrical body portion 12. The lower portion of the pressure vessel is also provided with a hemispherical member 13 welded to the lower end of the cylindrical body portion 12 which forms the main body of the pressure vessel 10.

The end closure 11 of the heat exchanger is provided with an axially positioned nozzle 14 which is arranged to receive the fuel and combustion air delivered to the pressure vessel 10. As shown in FIGS. 1 and 3, gas is introduced through an inlet fitting 15 extending through the wall of the nozzle 14 to a gas ring 16. The ring 16 is formed in the shape of an annulus and discharges gas through a plurality of orifices around the inner circumference thereof. Combustion air is introduced into the nozzle 14 through a plurality of four equally spaced tangentially connected inlet pipes 17 so that the incoming combustion air is swirling violently before moving past the gas ring 16 and into the upper portion of the pressure vessel 10.

A lighter 19 is extended into the nozzle 14 above the air inlets 17. The lighter is of well known type and may include a spark plug and a valve controlled fuel gas line. While the main fuel gas line supplying the ring 16 delivers gas at a relatively high pressure, as for example 15 p.s.i.g. (pounds per square inch gage), the gas delivered through the lighter 19 may be at a lower pressure, as for example, 3 p.s.i.g. The nozzle 14 is further provided with an opening in the wall thereof for a sighting port 20 to observe conditions within the nozzle, and is also provided with an opening for the installation of a flame detector 21.

An outlet nozzle 18 is also provided in the side of the upper closure 11 of the pressure vessel for the discharge of the high pressure gas or air heated in the vessel. When installed in its operative arrangement with the test tunnel, the nozzle 18 is provided with a valve (not shown) which is used to control the flow of high pressure heated air from the heat exchanger through an expansion nozzle into the test tunnel (not shown).

As shown in FIG. 1, the pressure vessel 10 is mounted with its longitudinal axis in an upright position, provided with brackets 22 on the sides thereof, and is further provided with a thrust brace 23 which is secured to the vessel on the side opposite the hot air outlet nozzle 18.

An axially positioned nozzle 24 is formed in the end of the hemispherical member 13 and is used both for the discharge of the cooled heating gases from the vessel, and alternately for the introduction of the high pressure air which is to be heated. The heating gas outlet member 25 is formed in the side of the nozzle 24 and discharges the spent heating gas to other low temperature heat exchangers (not shown) or directly to the atmosphere, as desired. The spent heating gases, leaving the heater through the outlet member 25, are cooled by the spray injection of cooling water through a nozzle 26 so that the temperature of the gases will be low enough to utilize ordinary carbon steel pipe connections leading to the low temperature heat exchangers or to the stack.

The lower end portion of the nozzle 24 is formed with a hemispherical end portion 27 having a central opening therein to which is attached an elbow inlet tube 28 for the introduction of the high pressure air to be heated. High pressure air is discharged, under controlled timing conditions, from exterior accumulator tanks (not shown) which are in turn supplied by air compressors so that the air admitted to the heat exchanger may be at the desired pressure.

While the nozzle 24 is protected by cooling coils, as hereinafter described, an internal sleeve 30 of heat resisting metal is also inserted axially of the nozzle, through which the gases flow, out of contact with the nozzle wall or the cooling coils. The upper end of the sleeve 30 is attached to a bell-like end portion 31 which projects upwardly into the pressure vessel, while the lower end is provided with an annular plate 32 having a central opening through which is inserted a thin walled pipe section 33 extending through the elbow tube 28. The sleeve 30 is also provided with an opening in one side, with a tubular member 34 attached thereto and extending into the nozzle 25. The nozzle 25 is enclosed by a water jack 35 so that the exterior surface of the nozzle may be cooled to regulate the temperature thereof. In a similar manner, the elbow 28 is cooled by a water jacket 36 with both jackets 35 and 36 receiving cooling water through suitable connections 37—40.

The pressure vessel is supported in an upright position and is substantially filled with a suitable heat transfer medium which may take the form of pebbles or pellets of refractory material which may be of generally spherical or cylindrical shape and have a major dimension of from ½" to 1". The bed 41 of pebbles fills the pressure vessel to a level 42 spaced below the high pressure discharge nozzle 18 and forms a lower perforate surface of a combustion and gas disengaging space 43. The heat transfer and heat storage capacity of the bed 41 of pebbles is influenced by the size and the physical characteristics of the pebbles, with the size and weight of the pebbles being determinative of the flow velocity of the gases passing through the bed. At the lower end of the pressure vessel, the pebbles are retained in the heat exchanger by a suitable perforated dome 44, where the perforations in the dome are small enough to avoid movement of pebbles therethrough, while at the same time permitting the passage of gases in either direction through the perforation at a minimum pressure drop, for the heat exchange contact between the heating gases, the heated gases, and the pebble bed.

Since the pressure vessel is exposed to both high pressures and in addition, exposed to drastic changes in both pressure and temperature in a cycle frequency of ½ to 1 hour, it is necessary to protect the vessel so as to avoid wall failure from thermal shock, and also to prevent corrosion which might be caused by condensation on the walls of the vessel. Accordingly, the vessel is provided with fluid cooled coils 45 which are located along the inner surface of the vessel where the coils are arranged in parallel in a plurality of separately supplied circuits. As shown in FIGS. 1 and 1A, the coils are embedded in an initially plastic insulating refractory material 46 so that the coils are not directly in contact with the pressure vessel walls. Inwardly of vessel 10, the refractory insulating material 46 surrounding the coils is covered by a layer of high temperature insulating material 47, such as insulating fire brick, which in turn is inwardly moved by a layer of high temperature and erosion resisting refractory material 48 such as zirconium oxide.

As shown in FIG. 1, the expansion joint 50 is located upwardly adjacent the upper level 42 of the pebble bed 41 so the pebbles will not enter the expansion joint. The joint is formed by an annular gap in the refractory lining with the gap 51 provided with a protective formation of tubular members with successive upward turns 52 of a coil decreasing in diameter to a position adjacent the inner face of the refractory lining 48. Other turns 53 of the coil are concentric adjacent the upper edge of the gap 51 and end adjacent the metallic walls of the vessel. The upper margin of the gap 51 is defined by an annular shelf member 54 supported from the wall of the vessel, with the shelf in turn supporting the refractory lining of the upper portion of the vessel.

The variation in the temperature in the metallic wall of the vessel is maintained at a low value by the flow of fluid through the coils 45 so that the expansion and contraction thereof is at a minimum. Usually the fluid passed through the tubular coils will be at a relatively low inlet temperature, as for example 60–100 F., thereby functioning to remove heat. Although under some operating conditions, it may be desirable to circulate heated fluid through the coils so as to avoid condensation of moisture on the walls of the pressure vessel. However, in normal use the metallic walls of the pressure vessel will be maintained within 100 to 200 degrees of differential temperature throughout the operating cycle. The temperature of the refractory material lining the pressure vessel will vary through a considerably wider range and it is necessary to provide an expansion joint therein so as to avoid crushing the refractory material when the heat exchange device is operating in its higher temperature range.

The tubular coil circuits or units are typically arranged as shown in FIG. 2 where each coil is provided with an inlet connection 56 extending through the wall of the pressure vessel, and a circumferentially spaced outlet connection 57 which also extends through the wall of the pressure vessel. Similarly disposed coil units are arranged to follow the contour of the hemispherical heads 11 and 13, and of the nozzles 14, 18 and 24.

Each of the individual coil units is separately supplied with fluid from a common header 60 through a valved connection 61 (see FIG. 4), and discharges the fluid through a connecting pipe 63 to a common outlet header 64. The fluid may be recirculated through the coils, after passing through a heat exchanger 65 where the fluid may be heated or cooled, as required. In the operation of the unit described, each of the separate coils is provided with temperature sensitive means responsive to the differential temperatures of the fluid entering and leaving each coil. The differential temperature sensing mechanism such as thermocouples 66 and 67 is operatively connected through a controller 61' with a valve positioning device 68 so that the flow of fluid through the coil may be regulated in accordance with the cooling requirements of the coil. It is also contemplated that an unusual, or unexpected increase in the differential temperatures between the inlet and outlet of the coil will cause an alarm signal to attract the attention of an operator, since such a change in differential temperatures may be indicative of damage to the coil or of a refractory failure in the particular part of the fluid heater adjacent the coil. If such temperature differentials become excessive, it then becomes necessary to shut down the apparatus to effect necessary maintenance and repair.

In the illustrated embodiment of the invention, the coils 58 are arranged in 28 separate flow circuits and the diameter of the tubes will be ½ inch in the nozzle 14, 1 inch in the nozzle 18 and 1¼ inch in the body of the heat exchanger. With a vessel having a diameter of 11 feet 6 inches inside the shell, with a shell thickness of 8 inches, and an overall length of approximately 45 feet, the weight of the pressure vessel, metal only, will be approximately 500,000 pounds. The pebble charge will weigh 225,000 pounds, and the refractory lining will approximate 175,000 pounds for a total heater weight of 900,000 pounds.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of the invention may sometimes be used to advantage without a corresponding use of other features.

What is claimed is:

1. An upright pressure vessel of circular horizontal cross-section having hemispherical upper and lower end closures with an outlet for a heated fluid in the upper portion thereof, a nozzle coaxial with and opening to the upper closure, means for introducing fuel and air into said nozzle for discharge into said vessel, a nozzle coaxial with and opening to the lower closure and having an outlet for combustion gases and an inlet for the fluid to be heated in the lower portion thereof, means for cooling said nozzles, means for maintaining a bed of gas pervious heat transfer material in said vessel, the upper level of said bed being spaced below said heated fluid outlet to provide a combustion space and a heated gas disengaging space in the upper portion of said vessel, a plurality of tubular coils each centered on the axis of and positioned in end-to-end relationship adjacent the internal surface of said pressure vessel and said nozzles, means for passing a separately controlled heat exchange fluid through each of said coils, and refractory means surrounding said tubular coils and defining the boundary of said bed of gas pervious heat transfer material.

2. An upright pressure vessel of circular horizontal cross-section having hemispherical upper and lower end closures with a nozzle inlet for fuel and combustion air to and an outlet means for a heated fluid from the upper portion thereof, a nozzle forming an outlet for combustion gases and an inlet for the fluid to be heated positioned in the lower portion of said vessel, means for maintaining a bed of gas pervious heat transfer material in said vessel, the upper level of said bed being spaced below said heated fluid outlet means to provide a combustion space and a heated gas disengaging space in the upper portion of said vessel, means for maintaining the wall of said pressure vessel and said nozzles at a selected temperature including a plurality of tubular coils each centered on the axis of and positioned in end-to-end relationship adjacent the internal surface of said pressure vessel, an external fluid heat exchanger, means connecting said heat exchanger with each of said coils for flow of fluid therethrough, and refractory means surrounding said tubular coils and defining the boundary of said bed of gas pervious heat transfer material.

3. An upright thick-walled metallic pressure vessel of circular horizontal cross-section having an axis and hemispherical upper and lower end closures with a nozzle inlet for fuel and combustion air and an outlet means for a heated fluid in the upper portion thereof, and a nozzle having an outlet for combustion gases and an inlet for the fluid to be heated in the lower portion thereof, means for maintaining a bed of gas pervious heat transfer material in said vessel, the upper level of said bed being spaced below said heated fluid outlet means to provide a combustion space and a heated gas disengaging space in the upper portion of said vessel, means for maintaining the wall of said pressure vessel at a selected temperature including a plurality of substantially horizontally disposed tubular coils each centered on the axis of and positioned in vertically contiguous relationship adjacent the internal surface of said pressure vessel and said upper and lower end closures, an external fluid heat exchanger, means connecting said heat exchanger with each of said coils for flow of fluid therethrough, and heat responsive means for regulating the flow of fluid through each of said coils, and refractory means surrounding said tubular coils and defining the boundary of said bed of gas pervious heat transfer material.

4. In a regenerative high pressure air heater, the combination of an upwardly elongated thick-walled metallic pressure vessel capable of confining a pressure of the order of 2000 p.s.i. and having an upright axis, means for maintaining a stationary bed of particle-form heat transfer material within said vessel, means for cyclically heating said bed by heat exchange with hot gaseous combustion products, means for alternately heating high pressure air by heat exchange contact with said hot stationary bed, and means for protecting the metallic walls of said pressure vessel from the effects of said regenerative heating cycle including a plurality of substantially horizontally disposed tubular coils each centered on the axis of and closely adjacent the inner surface of the metallic walls of said pressure vessel and in vertically contiguous relationship, a layer of abrasion and heat resistant refractory material interposed between said insulating refractory and said stationary bed of particle-form material, and means for passing fluid through each of said tubular coils including valves for independently controlling the flow of fluid through each of said coils.

5. An upright thick-walled metallic pressure vessel of circular horizontal cross-section having a metallic wall portion of the order of 8 inches in thickness with upper and lower metallic end closures, said upper end closure having inlet means for fuel and combustion air and an outlet means for a heated fluid, said lower end closure having an outlet means for combustion gases and an inlet means for the fluid to be heated, means for maintaining a bed of gas pervious heat transfer material in said vessel, the upper level of said bed being spaced below said heated fluid outlet means to provide a combustion space and a heated gas disengaging space in the upper portion of said vessel, a plurality of tubular coils each centered on the upright central axis of and positioned in end-to-end relationship adjacent the internal wall surface of said metallic pressure vessel and said metallic end closures, means for passing fluid through each of said tubular coils including valves for independently controlling the flow of fluid through each of said coils, and refractory means surrounding said tubular coils and defining the boundary of said bed of gas pervious heat transfer material.

6. An upright thick-walled metallic pressure vessel of circular horizontal cross-section having an upright axis and hemispherical upper and lower end closures with an inlet nozzle for the introduction of fuel and combustion air to and an outlet means for discharge of a heated fluid from the upper portion thereof, a nozzle forming an outlet for combustion gases and an inlet means for the fluid to be heated in the lower portion of said vessel, means for cooling the metallic walls of said nozzles, means for maintaining a bed of gas pervious heat transfer material in said vessel, the upper level of said bed being spaced below said heated fluid outlet means to provide a combustion space and a heated gas disengaging space in the upper portion of said vessel, a plurality of tubular coils each centered on said upright axis and positioned in end-to-end relationship adjacent the internal surface of said metallic pressure vessel, means for passing fluid through each of said tubular coils including valves for independently controlling the flow of fluid through each of said coils, and refractory means surrounding said tubular coils and defining the boundary of said bed of gas pervious heat transfer material.

References Cited in the file of this patent

UNITED STATES PATENTS

| | | |
|---|---|---|
| Re. 19,757 | Royster | Nov. 12, 1935 |
| 2,120,000 | Neil | June 7, 1938 |
| 2,201,738 | Neve | May 21, 1940 |
| 2,360,855 | Dow et al. | Oct. 24, 1944 |
| 2,671,658 | Moore | Mar. 9, 1954 |
| 2,688,046 | Norton et al. | Aug. 31, 1954 |
| 2,719,818 | Findlay | Oct. 4, 1955 |